May 9, 1933.  R. F. KOHR ET AL  1,907,983
BRAKE
Filed Oct. 25, 1930
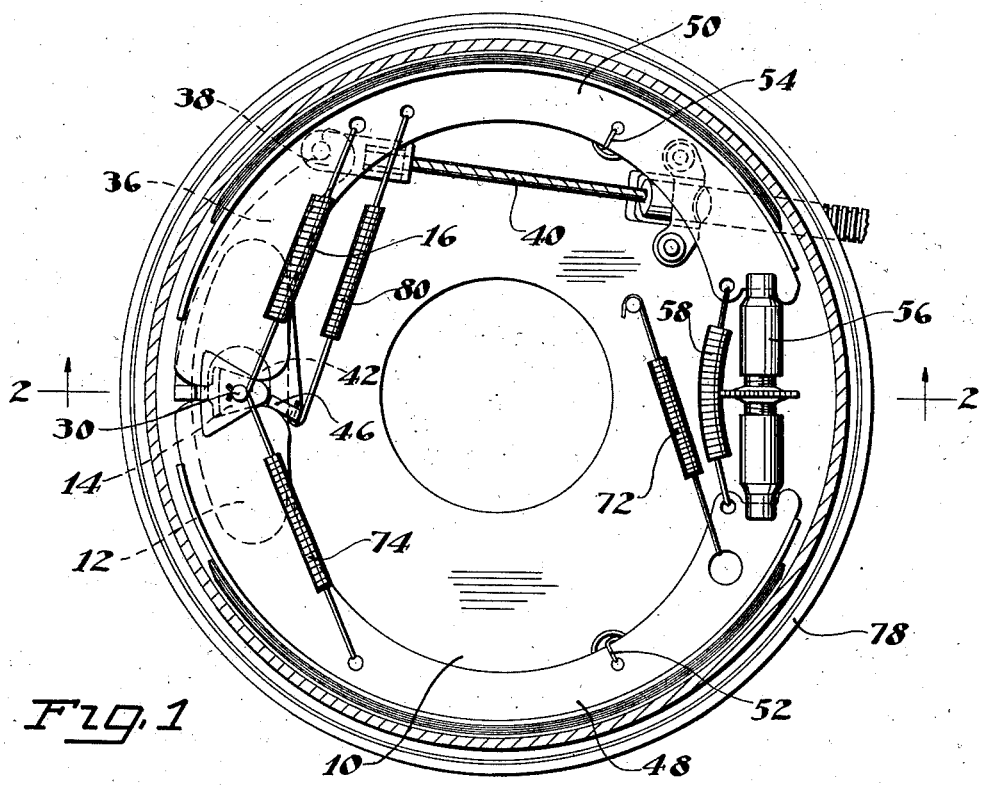
Fig. 1
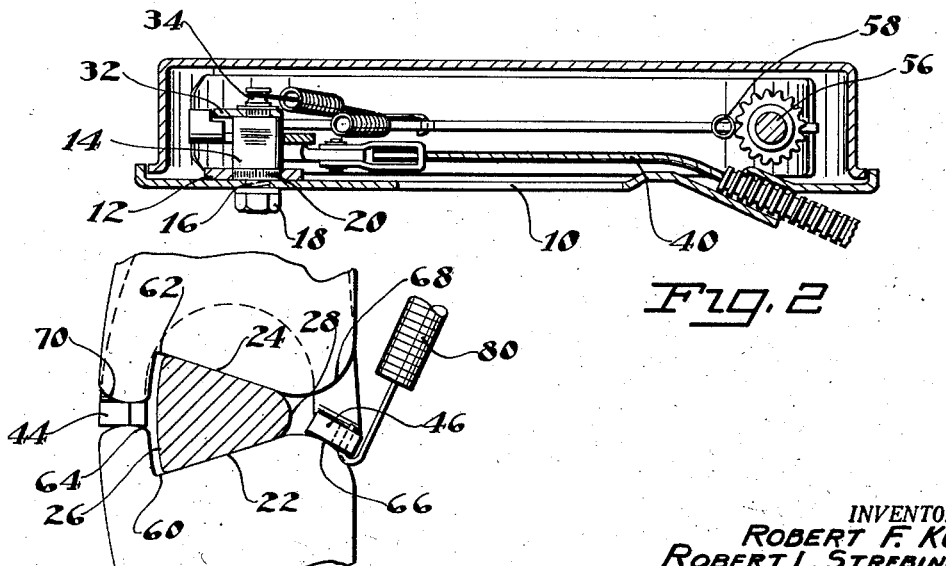
Fig. 2
Fig. 3
INVENTOR.
ROBERT F. KOHR
ROBERT L. STREBINGER
BY
*M. W. McConkey*
ATTORNEY Patented May 9, 1933

1,907,983

UNITED STATES PATENT OFFICE

ROBERT F. KOHR AND ROBERT L. STREBINGER, OF SOUTH BEND, INDIANA, ASSIGNORS TO BENDIX BRAKE COMPANY, OF SOUTH BEND, INDIANA, A CORPORATION OF ILLINOIS

BRAKE

Application filed October 25, 1930. Serial No. 491,139.

This invention relates to brakes and more particularly to internal expanding brakes.

An object of the invention is to attain smooth operation of the brakes under all conditions and to avoid abnormal conditions, such as sensitiveness and grabbing of the friction elements.

Another object of the invention is to provide a brake structure in which the possibility of the brakes making a clicking noise as the frictional elements are brought into operation is reduced to a minimum.

A further object of the invention is to provide a brake structure having a single anchor designed to effectively anchor the friction elements and to support them in proper spaced relation to the drum of the brake.

A further object of the invention is to provide a brake structure having an operating member, an operating cable connected thereto and means associated with the operating member for imposing tension on the operating cable.

A salient feature of the invention is a single non-adjustable anchor of a particular structure designed to effectively anchor the friction elements and to remove the possibility of clicking as the friction elements are brought into operation.

An important feature of the invention is a brake structure having a friction element and a floating operating member therefor actuated through an operating cable, and means connecting the operating member to the friction element to effectively take up slack in the operating cable.

Other objects of the invention will appear from the following description taken in conjunction with the drawing which forms a part of this specification, and in which:

Figure 1 is a vertical sectional view taken just back of the head of the drum showing the friction elements in side elevation and illustrating the invention as applied;

Figure 2 is a sectional view substantially on line 2—2, Figure 1; and

Figure 3 is an enlarged detailed view illustrating the anchor and the relation of the friction elements and operating member with respect thereto.

Referring to the drawing for more specific details of the invention, 10 represents a fixed support such as a backing plate. Positioned on the backing plate is a reinforcing member 12 which may be spot-welded or otherwise secured in position. As shown, an anchor 14 is provided with a shank 16 which extends through the backing plate and receives a nut 18. The base of the anchor is serrated as indicated at 20, so that it may be permanently secured to the reinforcing member 12. The anchor 14 has diverging faces 22 and 24 connected by rounded or arcuate surfaces 26 and 28 and formed on the free end thereof is a pin 30 on which is slipped a retaining plate 32 secured in position by shearing the pin. This pin is provided with a circumferential groove or slot 34, the object of which will hereinafter appear.

A floating operating member 36 is positioned on the anchor. This operating member comprises an arcuate lever having a hook 38 for connecting an operating cable 40 extending through the backing plate to a suitable source of power. This lever is provided with a slot 42 adapted to straddle the anchor and to slide freely on the arcuate faces 26 and 28 thereof and bent at right angles to the lever are cam members 44 and 46. The faces of these cam members are arranged in diverging relation with respect to each other, the object of which will hereinafter appear.

Positioned for movement on the backing plate are articulated friction elements 48 and 50. As shown, these friction elements or shoes are positioned on suitable steady rests 52 and 54 and are connected at their articulated ends by an adjusting member 56 retained in engagement with the friction elements by a tension spring 58 which also serves to retain the adjusting member in adjusted position.

The separable ends of the friction elements are adaptable for engagement with the cams 44 and 46 on the operating lever 38. As shown, the separable ends of the friction elements are notched as indicated at 60 and 62 to conform to the contour of the anchor and are further provided with rounded shoulders 64, 66, 68 and 70 adapted to engage the cams 44 and 46.

The friction element 48 is connected at its articulated end by a suitable return spring 72 to the fixed support 10. As shown, the friction element 48 and the friction element 50 are each connected by suitable return springs 74 and 76 to the pin 30 on the anchor 14. Preferably, the spring 74 has less tensile strength than the spring 76, so that upon actuation of the operating member, the friction element 48 will move from the anchor in advance of movement of the friction element 50 to engage the friction element 48 with the braking surface of a rotatable drum 78 in advance of the engagement of the friction element 50 with the drum.

The friction element 50 is connected by a spring 80 to the cam 46 on the lever 36. This spring serves to return the operating lever to its normal position and to place tension on the operating cable to remove slack, so that smooth operating effect may be attained.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what we claim as new and desire to secure by Letters Patent is:

1. A brake structure comprising an anchor having diverging anchoring surfaces connected by curved surfaces and a retaining plate secured on the free end of the anchor.

2. A brake structure comprising a floating operating lever having diverging thrust lugs separated by a recessed portion.

3. A brake structure comprising a floating operating lever, diverging cams on the lever, an operating cable connected to the lever, a friction element adaptable for actuation by the cams and means connecting one of the cams to the friction element imposing tension on the operating cable.

4. A brake structure comprising a fixed anchor having diverging anchoring surfaces, a floating operating member having diverging cams associated with the anchor, a friction element having separable notched ends conforming to the anchor and provided with shoulders adaptable for engagement with the cams and means tending to retain the separable ends of the friction element in engagement with the anchor.

5. A brake structure comprising a fixed anchor having diverging anchoring surfaces connected by curved surfaces, a floating operating member associated with the anchor, diverging cams on the operating member, a friction element having separable ends notched to conform to the anchor and rounded shoulders for co-operation with the cams, means tending to retain the separable ends of the friction element in engagement with the anchor and means tending to return the operating member to its normal position.

6. A brake structure comprising a fixed anchor having diverging anchoring surfaces, an operating member associated with the anchor, diverging cams on the operating member, articulated friction elements having separable ends notched to conform to the anchor and rounded shoulders for engaging the cams, tension members connecting the friction elements and a tension member connecting one of the friction elements to the operating member.

7. A brake structure comprising a fixed support, a rotatable drum associated therewith, a fixed anchor on the support having diverging bearing surfaces connected by rounded surfaces, a retaining plate on the free end of the anchor, a floating operating member associated with the anchor, diverging cams on the operating member, articulated primary and secondary shoes positioned for movement on the backing plate having their separable ends notched to conform to the anchor and rounded shoulders for engaging the diverging cams, springs of different tensile strength connecting the respective primary and secondary friction elements to the anchor, an operating cable connected to the operating member and means connecting the operating member to one of the friction elements tending to impose tension on the operating cable.

8. A brake having friction means having inclined anchor surfaces at its ends, a wedge-shaped anchor embraced between said surfaces, and an operating lever having thrust portions on opposite sides of the anchor and in engagement respectively with the ends of the friction means and recessed between the thrust portions to clear the anchor.

9. A brake comprising friction means formed with stiffening webs having inclined anchor surfaces at their ends, a wedge-shaped anchor embraced between said ends, an operating lever having thrust portions engaging said ends and having a part extending upwardly alongside one of said webs, and operating means acting on said lever.

In testimony whereof, we have hereunto signed our names.

ROBERT F. KOHR.
ROBERT L. STREBINGER.